(12) United States Patent
Jung et al.

(10) Patent No.: US 12,417,175 B2
(45) Date of Patent: Sep. 16, 2025

(54) STORAGE DEVICE AND DATA PROCESSING METHOD

(71) Applicant: Samsung Electronics Co., Ltd., Suwon-si (KR)

(72) Inventors: Byungsue Jung, Suwon-si (KR); Hyunwoo Song, Suwon-si (KR); Kyunga Lee, Suwon-si (KR); Kyungduk Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/207,694

(22) Filed: Jun. 9, 2023

(65) Prior Publication Data

US 2024/0168881 A1 May 23, 2024

(30) Foreign Application Priority Data

Nov. 22, 2022 (KR) ........................ 10-2022-0157220

(51) Int. Cl.
*G06F 12/00* (2006.01)
*G06F 12/0802* (2016.01)

(52) U.S. Cl.
CPC .. *G06F 12/0802* (2013.01); *G06F 2212/1024* (2013.01)

(58) Field of Classification Search
CPC ............ G06F 12/0802; G06F 2212/1024
See application file for complete search history.

(56) References Cited

U.S. PATENT DOCUMENTS

| 8,996,781 | B2 | 3/2015 | Schuette et al. |
| 9,582,222 | B2 | 2/2017 | Yang et al. |
| 10,079,878 | B2 | 9/2018 | Ulrich et al. |
| 10,216,419 | B2 | 2/2019 | De |
| 10,573,054 | B2 | 2/2020 | Herr et al. |
| 11,150,836 | B2 | 10/2021 | Williams et al. |
| 11,163,465 | B1 | 11/2021 | Dalmatov et al. |

(Continued)

FOREIGN PATENT DOCUMENTS

| EP | 3647932 A1 | 5/2020 |
| EP | 3771984 A1 | 2/2021 |
| WO | 2020210163 A1 | 10/2020 |

OTHER PUBLICATIONS

European Search Report dated Mar. 19, 2024 for corresponding European Patent Application No. 23199869.1.

*Primary Examiner* — Daniel D Tsui
(74) *Attorney, Agent, or Firm* — Muir Patent Law, PLLC

(57) ABSTRACT

A storage device includes a non-volatile memory, a buffer memory, and a storage controller. The controller receives first host data indicating a first logical block address range of the non-volatile memory from a host device, reads first memory data from the non-volatile memory using the first logical block address range, and stores the first memory data in the buffer memory. The storage controller further receives a read command and a read address from the host device, determines whether the read address is within the first logical block address range, read, in response to the read address being determined as within the first logical block address range and the read command, the first memory data from the buffer memory, without accessing the non-volatile memory, and outputs the first memory data from the buffer memory to the host device.

17 Claims, 18 Drawing Sheets

(56) References Cited

U.S. PATENT DOCUMENTS

| | | |
|---|---|---|
| 11,392,499 B2* | 7/2022 | Das ................... G06F 12/0866 |
| 2007/0028053 A1* | 2/2007 | Shet ................... G06F 12/0871 |
| | | 711/E12.019 |
| 2011/0016264 A1* | 1/2011 | Yoshida ............. G06F 12/0866 |
| | | 711/E12.019 |
| 2014/0101405 A1 | 4/2014 | Papadopoulou et al. |
| 2017/0131917 A1 | 5/2017 | Yun et al. |
| 2019/0391756 A1* | 12/2019 | Wang ................... G06F 3/0659 |
| 2020/0393992 A1* | 12/2020 | Lim ....................... G11C 16/26 |
| 2021/0034296 A1 | 2/2021 | Park et al. |
| 2022/0199179 A1* | 6/2022 | Padilla ................. G06F 11/076 |
| 2022/0350746 A1 | 11/2022 | Das et al. |
| 2023/0096408 A1* | 3/2023 | Na .......................... G06F 11/30 |
| | | 711/154 |

* cited by examiner

STORAGE DEVICE AND DATA PROCESSING METHOD

CROSS-REFERENCE TO RELATED APPLICATION

This application claims priority to and the benefit of Korean Patent Application No. 10-2022-0157220 filed in the Korean Intellectual Property Office on Nov. 22, 2022, the entire contents of which are incorporated herein by reference.

BACKGROUND

(1) Field of the Disclosure

The present disclosure relates to a storage device and a data processing method.

(2) Description of the Related Art

Storage devices are used as data storage media of various types of electronic devices. The storage device receives a read command and an address from a host device, reads data stored in the address, and provides the data to the host device.

In an operation, the host device repeatedly input the read command of reading data stored in the same address to the storage device. The storage device repeatedly reads the data stored in the same address, thereby increasing latency. Therefore, research on the methods for operating the storage device with lower read latency are in progress.

SUMMARY

The present disclosure is to provide a storage device for increasing data read performance, and a data processing method.

The present disclosure is to provide a storage device with a low read latency, and a data processing method.

According to an embodiment of the present disclosure, a storage device includes a non-volatile memory, a buffer memory, and a storage controller. The controller receives first host data indicating a first logical block address range of the non-volatile memory from a host device, reads first memory data from the non-volatile memory using the first logical block address range, and stores the first memory data in the buffer memory. The storage controller further receives a read command and a read address from the host device, determines whether the read address is within the first logical block address range, read, in response to the read address being determined as within the first logical block address range and the read command, the first memory data from the buffer memory, without accessing the non-volatile memory, and outputs the first memory data from the buffer memory to the host device.

The storage controller further reads, in response to the read address being determined as not in the first logical block address range and the read command, second memory data from the non-volatile memory based on the read address, stores the second memory data in the buffer memory, and outputs the second memory data from the buffer memory to the host device.

The buffer memory includes a first region configured to store the first memory data and a second region configured to store the second memory data.

The storage controller further counts a first number of outputting the first memory data stored in the first region of the buffer memory, count a second number of outputting the second memory data stored in the second region of the buffer memory, and adjust a size of the first region and a size of the second region based on the first and second numbers.

The storage controller initializes, in response to a specific value included in the first host data, a size of the first region and a size of the second region.

The storage controller initializes, in response to a specific value included in the first host data, the first memory data stored in the buffer memory.

The first host data includes read data attribute information for indicating a read frequency of the first memory data associated with the first logical block address range. The storage controller selectively stores the first memory data associated with the first logical block address range in the buffer memory based on the read frequency.

The storage controller receives data that are associated with a plurality of read ranges, and selectively stores the data associated with the plurality of read ranges in the buffer memory as the first memory data based on a read frequency of respective data associated with the plurality of read ranges. Each read range of the plurality of read ranges is a corresponding logical block address range of the non-volatile memory.

The storage controller selectively stores the data associated with the plurality of read ranges in the buffer memory based on the read frequency for respective data associated with respective read ranges when a size of a first region for storing the first memory data of the buffer memory is less than a size of the data associated with the plurality of read ranges.

The storage controller receives second host data indicating a second logical block address range of the non-volatile memory from the host device, and replaces the first memory data stored in the buffer memory with third memory data associated with the second logical block address range based on a read frequency of the third memory data associated with the second logical block address range and a read frequency of the first memory data stored in the buffer memory.

The storage device further includes an internal memory storing the read frequency of the first memory data stored in the buffer memory. The storage controller modifies the read frequency stored in the internal memory based on a number of outputting the first memory data to the host device.

The first host data includes a length of the first logical block address range, and a starting logical block address of the first logical block address range. The first logical block address range of the non-volatile memory corresponds to an address range between the starting logical block address and an ending logical block address that is represented by a sum of the starting logical block address and the length of the first logical block address range.

The storage controller receives a dataset management command from the host device, the dataset management command including a data pointer indicating a position of the first host data in a host memory of the host device, and reads the first host data among read range list data that are stored in the host memory of the host device based on the data pointer of the dataset management command.

According to an embodiment of the present disclosure, a method of operating a storage device comprising receiving, from a host device coupled to the storage device, a first dataset management command including a first data pointer indicating a position of first host data of a first read range; reading, from a host memory of the host device, the first host data of the first read range based on the first data pointer; reading first memory data that are associated with a first address in the first read range from a first memory and storing the first memory data in a second memory, wherein the second memory is faster than the first memory; receiving, from the host device, a read address and a read command; determining whether the read address is the same as the first address; and outputting, in response to the read address being determined as the same as the first address, the first memory data stored in the second memory to the host device.

The method further includes reading, in response to the read address being determined as not the same as the first address, second memory data that are associated with the read address from the first memory; storing the second memory data in the second memory; and outputting the second memory data to the host device.

The second memory includes a first region and a second region, the first memory data are stored in the first region, and the second memory data are stored in the second region.

The method further includes counting a first number of outputting the first memory data stored in the first region of the second memory; counting a second number of outputting the second memory data stored in the second region of the second memory; and adjusting a size of the first region and a size of the second region based on the first and second numbers.

The method further includes initializing, in response to a specific value included in the first host data of the first read range, a size of the first region and a size of the second region.

The method further includes receiving, from the host device, a second dataset management command including a second data pointer indicating a position of second host data of a second read range; reading, from the host memory of the host device, the second host data of the second read range based on the second data pointer, wherein the second host data of the second read range includes a second address to access the first memory of the storage device; and reading second memory data that are associated with the second address in the second read range from the first memory and replacing the first memory data stored in the second memory with the second memory data based on a first read frequency included in the first host data of the first read range and a second read frequency included in the second host data of the second read range. The first read frequency is a number of reading the first memory data, and the second read frequency is a number of reading the second memory data.

According to an embodiment of the present disclosure, a storage system includes a host device configured to: store a host data including a read range including an address in a host memory of the host device, output a dataset management command including a data pointer indicating a position of the host data in the host memory, and output a read address and a read command; and a storage device including a first memory and a second memory. The second memory is faster than the first memory. The storage device is configured to: receive the dataset management command; read the host data from the host memory of the host device using the data pointer of the dataset management command; and read a memory data from the first memory using the address in the host data to store the memory data in the second memory. The storage device is configured further to: receive the address and the read command from the host device; determine whether the read address is in the read range; and output, in response to the read address being determined as in the read range, the memory data stored in the second memory to the host device, without accessing the first memory.

The host data include a read frequency, and the storage device reads the memory data that are associated with the address of the read range and selectively stores the memory data in the second memory based on the read frequency.

DETAILED DESCRIPTION OF THE EMBODIMENTS

Figure 1:
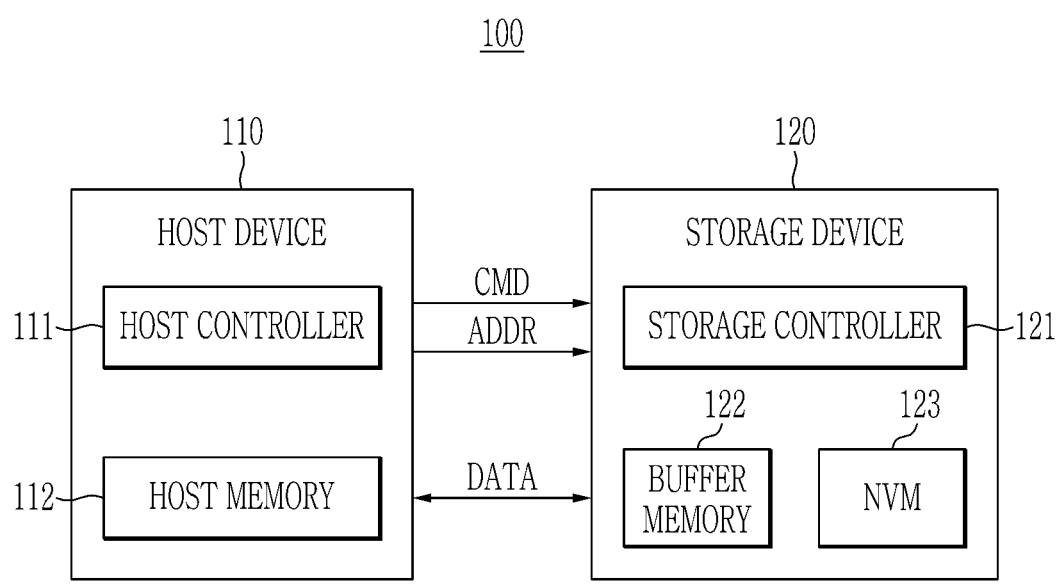
FIG. 1 shows a block diagram of a storage system according to an embodiment.

In the following detailed description, only certain embodiments of the present disclosure have been shown and described, simply by way of illustration. As those skilled in the art would realize, the described embodiments may be modified in various different ways, all without departing from the spirit or scope of the present disclosure.

Accordingly, the drawings and description are to be regarded as illustrative in nature and not restrictive, and like reference numerals designate like elements throughout the specification. In the flowcharts described with reference to the drawings in this specification, the operation order may be changed, various operations may be merged, certain operations may be divided, and certain operations may not be performed.

An expression recited in the singular may be construed as singular or plural unless the expression "one", "single", etc. is used. Terms including ordinal numbers such as first, second, and the like, will be used only to describe various components, and are not interpreted as limiting these components. The terms are only used to differentiate one component from other components.

FIG. 1 shows a block diagram of a storage system according to an embodiment.

Referring to FIG. 1, the storage system 100 may include a host device 110 and a storage device 120. In an embodiment, the storage system 100 may be included in user devices such as a personal computer, a laptop computer, a server, a media reproducer, and a digital camera, or automotive devices such as a global positioning system (GPS), a black box, and a vehicle electric device. In another way, the storage system 100 may be included in mobile systems such as a mobile phone, a smartphone, a tablet personal computer (PC), a wearable device, a healthcare device, and an Internet of things (IOT) device.

The host device 110 may control general operations of the storage system 100. In an embodiment, the host device 110 may be one of various processors such as a central processing unit (CPU), a graphics processing unit (GPU), a neural processing unit (NPU), a tensor processing unit (TPU), and the like. The host device 110 may include a single core processor or a multicore processor.

The host device 110 may include a host controller 111 and a host memory 112. The host memory 112 may function as a buffer memory for temporarily storing data that will be transmitted to the storage device 120 or data transmitted from the storage device 120.

The host controller 111 may generate a command CMD and may provide the command CMD to the storage device 120. The command CMD may include a logical block address ADDR. The host controller 111 may generate a dataset management (DSM) command, a device identifying command, and a read command. The host controller 111 may generate the dataset management command including a data pointer (DPTR) and a number of ranges (NR). The host controller 111 may store read range list data in a location of the host memory 112 indicated by the data pointer. In other words, the data pointer may corresponds to a memory address at which the read range list data are stored in the host memory 112. The read range list data may include data of at least one read range. The data on the read range (i.e., a host data) may include a read prepare field for indicating the data included in the read range to be anticipated to be read, read data attribute information for indicating a read frequency of the data included in the read range, a length in logical blocks of the read range, and a starting logical block address (LBA) of the read range. Hereinafter, the read range may correspond to a logical block address range from the starting LBA of the read range to an ending LBA. The ending LBA may correspond to a sum of the logical block length shown by a length in logical blocks and the starting LBA. The host controller 111 may transmit a device identifying command to the storage device 120. The storage device 120 may transmit device information including information on whether to support the read range to the host controller 111. The host controller 111 may generate the dataset management command when the storage device 120 determines to support the read range based on device information. The host controller 111 may generate a read command for controlling to read the data included in the read range and a logical block address included in the read range.

The host memory 112 may be a dynamic random access memory (DRAM) device, and may have a form factor of a dual in-line memory module (DIMM). However, a range of the present disclosure is not limited thereto, and the host memory 112 may include a non-volatile memory such as a flash memory, a phase change RAM (PRAM), a RRAM, and a magnetic RAM (MRAM). For example, the host memory 112 may include one of a DRAM, a not-AND (NAND) flash, a high bandwidth memory (HBM), a hybrid memory cube (HMC), a DIMM, an optane DIMM, a non-volatile DIMM (NVMDIMM), a double data rate synchronous DRAM (DDR SDRAM), and a low-power double data rate synchronous dynamic random access memory (LPDDR SDRAM), or combinations thereof.

The host device 110 may communicate with the storage device 120 through various types of interfaces. For example, the host device 110 may communicate with the storage device 120 through various types of interfaces such as a universal serial bus (USB), a multimedia card (MMC), a PCI express (PCI-E), an AT attachment (ATA), a serial AT attachment (SATA), a parallel AT attachment (PATA), a small computer system interface (SCSI), a serial attached SCSI (SAS), an enhanced small disk interface (ESDI), an integrated drive electronics (IDE), and a non-volatile memory express (NVMe).

The storage device 120 is accessed by the host device 110. The storage device 120 may include a storage controller 121, a buffer memory 122, and a non-volatile memory 123. The storage device 120 may store data or may process data in response to the command from the host device 110. For example, the storage device 120 may be a solid state drive (SSD), a smart SSD, an embedded multimedia card (eMMC), an embedded universal flash storage (UFS) memory device, a UFS memory card, a compact flash (CF), a secure digital (SD), a micro secure digital (Micro-SD), a mini secure digital (Mini-SD), an extreme digital (xD), or a memory stick.

The storage controller 121 may control an operation of the storage device 120. For example, the storage controller 121 may control an operation of the non-volatile memory 123 based on the command CMD and the logical block address ADDR received from the host device 110. The storage controller 121 may control the non-volatile memory 123 to write data on the non-volatile memory 123 in response to a write command from the host device 110, or may control the non-volatile memory 123 to read the data stored in the non-volatile memory 123 in response to a read command from the host device 110.

The storage controller 121 may receive a dataset management command from the host controller 111, and may read data on the read range stored in the logical block address of the host memory 112 indicated by a data pointer of the dataset management command. The storage controller 121 may read the data included in the read range from the non-volatile memory 123 and may store the data in the buffer memory 122 based on the data on the read range. For example, when the read prepare field of the data on the read range has a logic value "1", the storage controller 121 may read the data included in the read range from the non-volatile memory 123 and may store the data in the buffer memory 122. For another example, the storage controller 121 may/may not store the data included in the read range in the buffer memory 122 according to the read frequency indicated by the read data attribute information of the data on the read range. In detail, when the read data attribute information of the data on the first read range indicates a first read frequency and the read data attribute information of the data on the second read range indicates a second read frequency that is higher than the first read frequency, the storage controller 121 may not store the data included in the read range of the data on the first read range in the buffer memory 122 and may store the data included in the read range of the data on the second read range in the buffer memory 122. The storage controller 121 may receive a device identifying command from the host controller 111, and may transmit device information including information on whether to support the read range to the host controller 111.

The buffer memory 122 may store commands and data executed and processed by the storage controller 121. The buffer memory 122 may temporarily store data stored/to be stored in the non-volatile memory 123. The buffer memory 122 may buffer logical block addresses, request signals, data DATA, and commands CMD transmitted from the host device 110. The signals buffered by the buffer memory 122 may be transmitted to the non-volatile memory 123. For example, the data DATA buffered by the buffer memory 122 may be programmed to the non-volatile memory 123.

The buffer memory 122 may temporarily store the data included in the read range, and may output the temporarily stored data when the address included in the read range is input. The buffer memory 122 may include a fast read buffer for temporarily storing the data (i.e., which represent the data when the logical block address in which the data are stored is included in the read range, and which will be referred to as fast read data hereinafter) included in the read range and a normal read buffer for temporarily storing the data (which will be referred to as normal read data hereinafter) that are not included in the read range. A size of the fast read buffer and a size of the normal read buffer in the buffer memory 122 may be adaptively adjusted. The size of the fast read buffer and the size of the normal read buffer may be adaptively adjusted based on the number of receiving the read command (hereinafter, a fast read command) for reading the data included in the read range and the number for receiving the read command (hereinafter, a normal read command) for reading the data that are not included in the read range. For example, when the number of receiving the fast read command is greater than the number of receiving the normal read command, the size of the fast read buffer may be adjusted to be greater than the size of the normal read buffer. The storage device 120 may store the number of receiving the fast read command and the number of receiving the normal read command, and when it is turned on, it may set an initial size of the fast read buffer and an initial size of the normal read buffer based on the stored number of receiving the fast read command and the stored number of receiving the normal read command.

The buffer memory 122 may be realized with a volatile memory such as the DRAM and a static RAM (SRAM). However, without being limited thereto, the buffer memory 122 may be realized with various types of non-volatile memories including the MRAM, the PRAM, a resistive RAM (ReRAM), a flash memory, a nano-floating gate memory (NFGM), a polymer random access memory (PoRAM), and a ferroelectric random access memory (FRAM). The buffer memory 122 is shown to be installed outside the storage controller 121, and without being limited thereto, the buffer memory 122 may be installed in the storage controller 121.

The non-volatile memory 123 may store data. The non-volatile memory 123 may be realized with at least one memory chip or at least one memory die. For example, at least one memory chip may be a dual die package (DDP), a quadruple die package (QDP), or an octuple die package (ODP).

The non-volatile memory 123 may include a memory cell array including non-volatile memory cells for maintaining the stored data when the storage system 100 is turned off, and the memory cell array may be divided into a plurality of memory blocks. The memory blocks may have a two-dimensional (2D) horizontal structure in which the memory cells are disposed on a same plane (or a same layer) in a 2D way or a three-dimensional (3D) perpendicular structure in which the non-volatile memory cells are disposed in the 3D way. The memory cell may be a single level cell (SLC) for storing one-bit data or a multi-level cell (MLC) for storing data of two bits or more than those. However, without being limited thereto, the respective memory cells may be a triple level cell (TLC) for storing 3-bit data or a quadruple level cell (QLC) for storing 4-bit data.

The non-volatile memory 123 may include a NAND flash memory. In another embodiment, the non-volatile memory 123 may include an electrically erasable programmable read-only memory (EEPROM), a phase change random access memory (PRAM), a resistive RAM (ReRAM), a resistance random access memory (RRAM), a nano floating gate memory (NFGM), a polymer random access memory (PoRAM), a magnetic random access memory (MRAM), a ferroelectric random access memory (FRAM), and other types of memories that are similar to them. In the present disclosure hereinafter, the non-volatile memory 123 will be assumed to be a NAND flash memory device.

A method of operating a storage device 120 shown in FIG. 1 will now be described with reference to FIG. 2.

Figure 2:
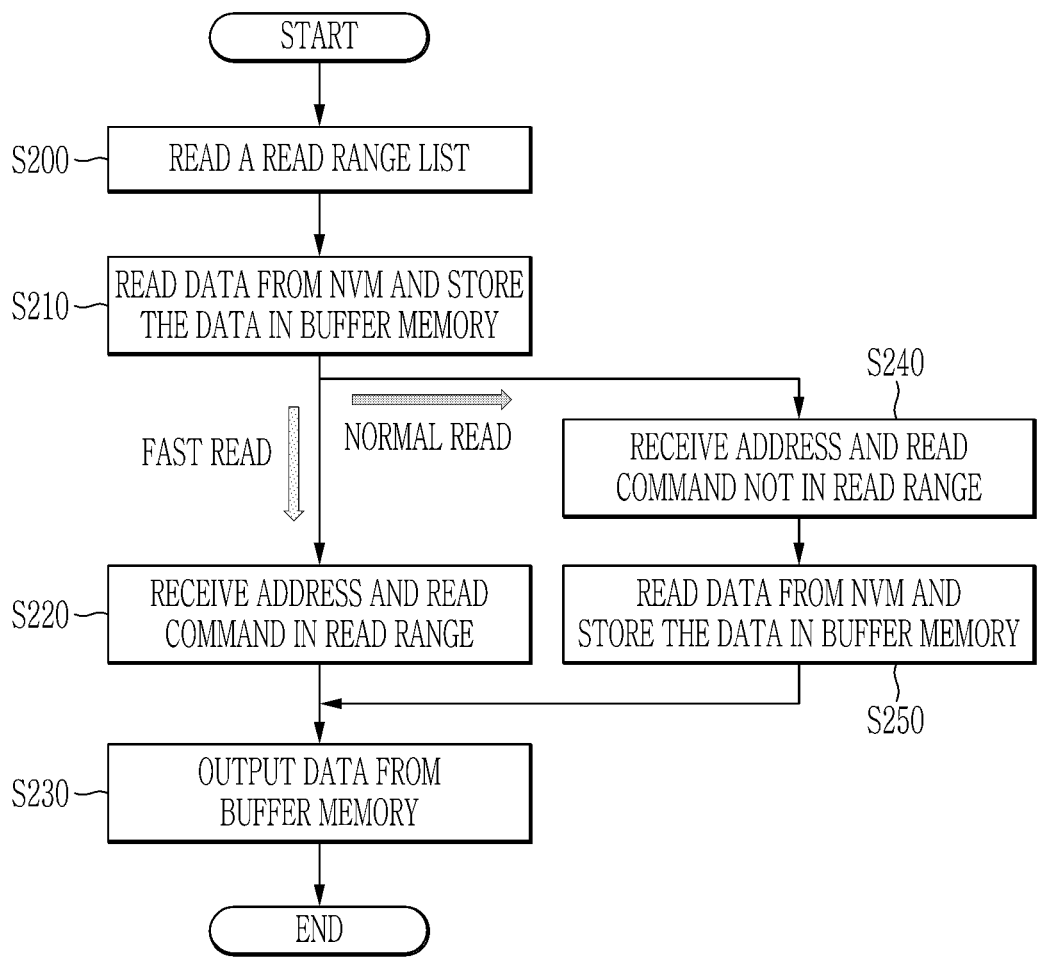
FIG. 2 shows a flowchart of a method of operating a storage device according to an embodiment.

FIG. 2 shows a flowchart of a method of operating a storage device according to an embodiment.

Referring to FIG. 2, the storage device 120 reads data on the read range from the host device 110 (S200). The storage controller 121 may read the read range list data stored in the logical block address of the host memory 112 indicated by the data pointer in the dataset management command input from the host device 110.

The storage device 120 reads data indicated by the data on the read range included in the read range list data from the non-volatile memory 123 and stores the data in the buffer memory 122 (S210). The storage controller 121 may read the data stored at the location of the non-volatile memory 123 that corresponds to the starting LBA of the data on the read range, and may store the read data in the buffer memory 122.

The storage device 120 receives an address and read command in the read range (S220). The storage device 120 outputs data stored in the buffer memory 122 (S230).

The storage device 120 receives an address and a read command that are not in the read range (S240). The storage device 120 reads data stored at the location of the non-volatile memory 123 corresponding to the received address, and stores the read data in the buffer memory 122 (S250). The storage device 120 outputs the data stored in the buffer memory 122 (S230).

The stages S220 and S230 may be referred to as a fast read operation, and the stages S240, S250, and S230 may be referred to as a normal read operation. In the fast read operation, a read operation may be performed without accessing the non-volatile memory 123.

Figure 3:
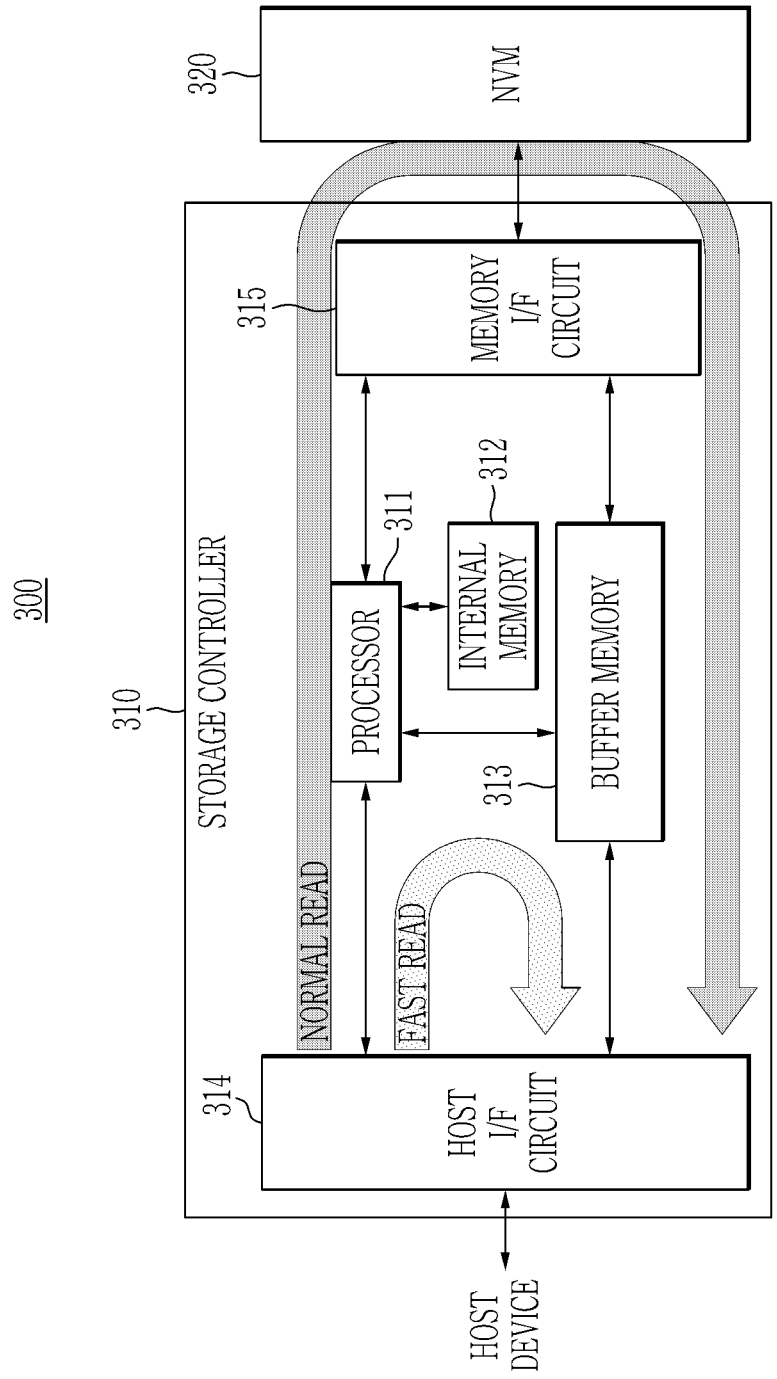
FIG. 3 shows a block diagram of a storage device according to an embodiment.

FIG. 3 shows a block diagram of a storage device according to an embodiment.

Referring to FIG. 3, the storage device 300 may include a storage controller 310 and a non-volatile memory 320. The buffer memory 313 is shown to be included in the storage controller 310 in FIG. 3. The present disclosure is not limited thereto. in some embodiments as described above with reference to FIG. 1, the buffer memory 313 may be individually configured outside the storage controller 310.

The storage controller 310 may include at least one processor 311, an internal memory 312, a host interface circuit 314, and a flash interface circuit 315.

The processor 311 may control an operation of the storage controller 310 in response to the command received from the host device (110 of FIG. 1) through the host interface circuit 314. For example, the processor 311 may control respective constituent elements by using firmware for driving the storage device.

The internal memory 312 may store the commands and the data performed and processed by the processor 311. The internal memory 312 may be realized with the volatile memory such as the DRAM and the SRAM or the non-volatile memory such as the PRAM and the flash memory. The internal memory 312 may store firmware and data for controlling the storage controller 310. For example, the internal memory 312 may store the number of the fast read operations and the number of the normal read operations. The stored firmware and data may be driven or processed by the processor 311. A software hierarchical structure of the storage controller 310 realized with firmware may include an interface layer and a flash translation layer (FTL).

The buffer memory 313 may store the data received from the non-volatile memory 320 through the flash interface circuit 315. The buffer memory 313 may store the data to be provided to the host device (HOST) according to the fast read operation and/or the data provided to the host device (HOST) according to the normal read operation. The buffer memory 313 may include a first region (hereinafter, a fast read buffer) in which data are stored by the fast read operation and a second region (hereinafter, a normal read buffer) in which data are stored by the normal read operation. A size of the fast read buffer and a size of the normal read buffer may be adjusted in the buffer memory 313.

The host interface circuit 314 may provide a physical connection between the host device (HOST) and the storage device 300. That is, the host interface circuit 314 may provide an interfacing function with the storage device 300 corresponding to a bus format of the host device (HOST). At least one of various types of interfacing methods such as USB, MMC, PCI-E, ATA, SATA, PATA, SCSI, SAS, ESDI, IDE, and NVMe may be applied to the host interface circuit 314.

The flash interface circuit 315 may communicate with the non-volatile memory 320. The flash interface circuit 315 may transmit data to the non-volatile memory 320, and may receive read data from the non-volatile memory 320. The flash interface circuit 315 may be connected to the non-volatile memory 320 through a channel. In another embodiment, the flash interface circuit 315 may be connected to the non-volatile memory 320 through a plurality of channels.

The storage controller 310 may further include an error checking and correcting (ECC) engine for performing an ECC encoding and an ECC decoding by using the Bose-Chaudhuri-Hocquenghem (BCH) code, the low density parity check (LDPC) code, the Turbo code, the Reed-Solomon Code, the convolutional code, the recursive systematic code (RSC), coded modulations such as the trellis-coded modulation (TCM) and the block coded modulation (BCM), and other error correcting codes.

Figure 4:
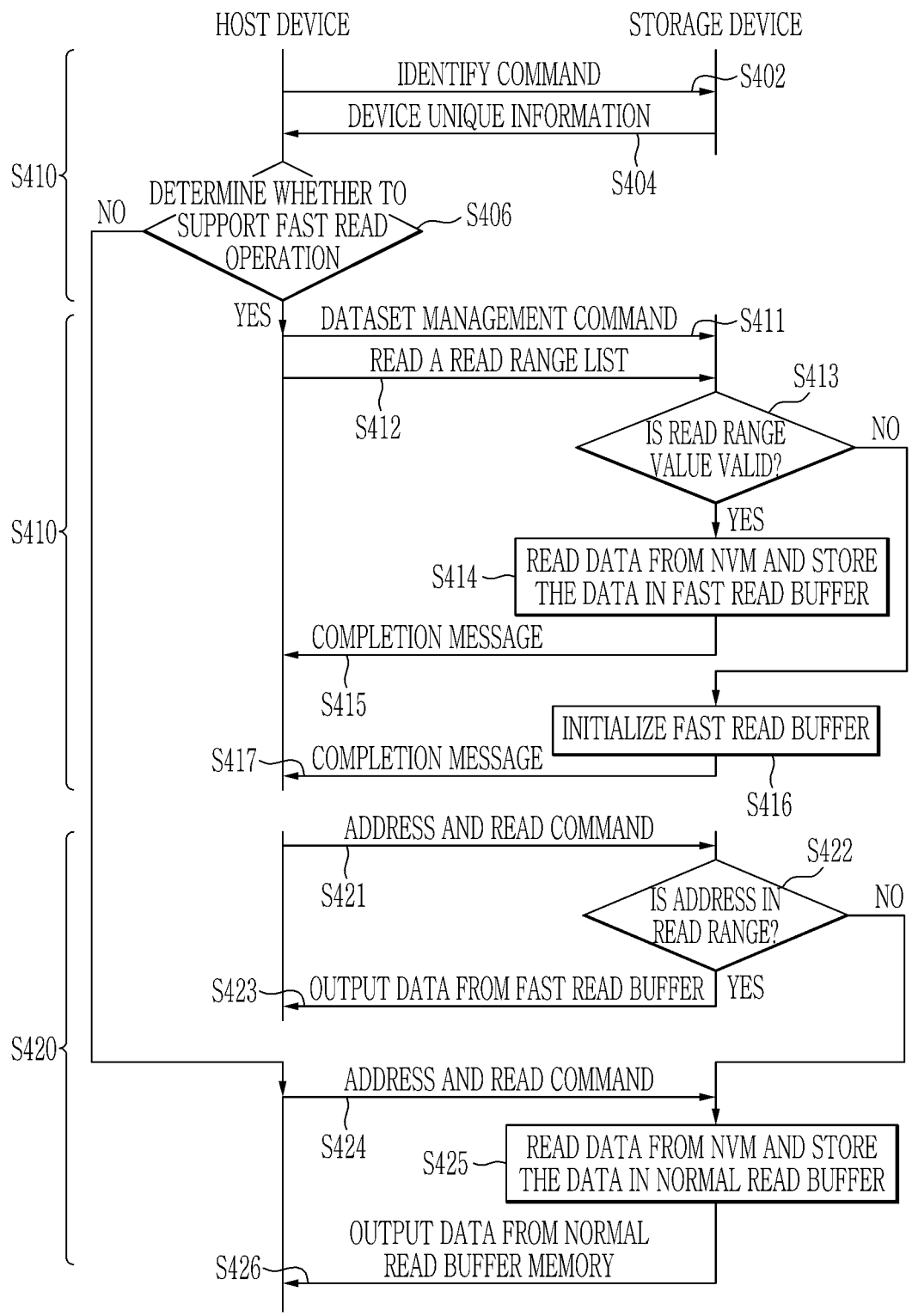
FIG. 4 shows a flowchart of a method of operating a host device and a storage device according to an embodiment.

FIG. 4 shows a flowchart of a method of operating a host device and a storage device according to an embodiment.

Referring to FIG. 4, the host device and the storage device may perform an identifying of S400, a read preparing of S410, and a reading of S420. The device identifying of S400 may include S402, S404, and S406, the read preparing of S410 may include S411, . . . , S417, and the reading of S420 may include S421, . . . , S426.

The host device transmits an identify command to the storage device (S402).

The storage device receives the identify command and transmits a device unique information to the host device (S404). The device unique information includes a vendor ID (VID), a sub-system vendor ID (SSVID), a serial number (SN), a model number (MN), capacity, a maximum data transmitting size (MDTS), a read data unit number, a write data unit number, a host read command, a host write command, and a controller using time, which is not limited thereto. For example, the device unique information may include an optional NVM command support (ONCS). The storage device may indicate whether to support the dataset management command of the storage device by using a specific bit of the ONCS. The storage device may indicate whether to support the fast read operation of the storage device by using the device unique information.

The host device determines whether the storage device supports the fast read operation based on the device unique information of the storage device (S406).

When the storage device supports the fast read operation (Yes in S406), the host device and the storage device sequentially perform the read preparing of S410 and the reading of 420.

When the storage device does not support the fast read operation (No in S406), the host device and the storage device may perform S424, S425, and S426 among steps of S421 to S426 in S420.

In the read preparation of S410, the host device provides the dataset management command to the storage device (S411). The storage device reads read range list data from the host device based on the dataset management command (S412). S410 and S411 will now be described with reference to FIG. 5.

Figure 5:
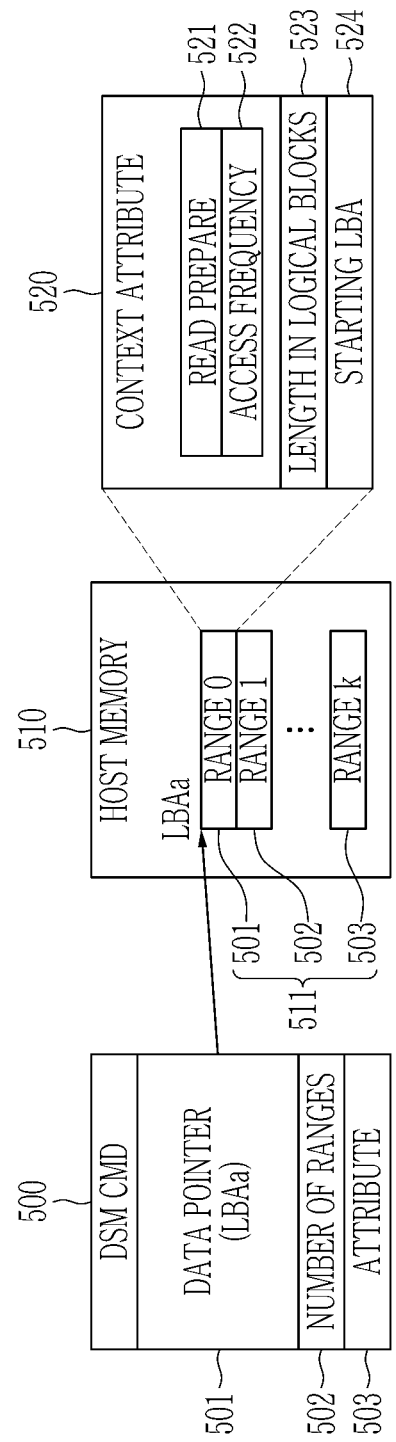
FIG. 5 shows data on commands of a host device and a read range stored in a host memory according to an embodiment.

FIG. 5 shows data on commands of a host device and a read range stored in a host memory according to an embodiment.

Referring to FIG. 5, a dataset command 500 may include a data pointer 501, a number of ranges 502, and attribute information 503. The data pointer 501 may indicate a logical block address (LBAa) of the host memory 510 storing read range list data 511. The number of ranges may indicate the number of the data on the read range. The data on the read range may be 16 bytes. The attribute information may indicate a combined dataset attribute for the read. When a value of the combined dataset attribute for a reading is set to be '1', the dataset must be optimized to a read access as a combined unit. The host device anticipates working tasks for an entire range provided as the combined unit for the read, which represents that when part of the dataset is read, the entire range of the dataset is anticipated to be read.

In S412, the storage device may read the read range list data 511 from the region of the host memory 510 that corresponds to the logical block address (LBAa) indicated by the data pointer 501. The storage device may read the data 511a, 511b, . . . , 511h on the read range by the number of the data on the read range from the region of the host memory 510 that corresponds to the logical block address (LBAa). The data 511a, 511b, . . . , 511h for the respective read ranges may include a context attribute 520, a length in logical blocks 523 of the read range, and a starting LBA 524 of the read range. The context attribute 520 may include a read prepare 521 for indicating that the data included in the read range are anticipated to be read in a near future and an access frequency 522 for indicating a read frequency of the data included in the read range. When the read prepare field 521 has a logic value of "1", the storage device may perform a read prepare operation on the data included in the read range. Here, the read prepare operation may include an operation for storing data in the fast read buffer. The access frequency 522 may be defined as expressed in Table 1, and the read frequency may be indicated with the values of 6 h and 7 h. In Table 1, the values may be represented using a hexadecimal number.

TABLE 1

| | | Value | Definition |
|---|---|---|---|
| AF: | 03:00 | 0h | No frequency information provided. |
| Access | | 1h | Typical number of reads and writes expected for this LBA range. |
| Frequency | | 2h | Infrequent writes and infrequent reads to the LBA range indicated. |
| | | 3h | Infrequent writes and frequent reads to the LBA range indicated. |
| | | 4h | Frequent writes and infrequent reads to the LBA range indicated. |
| | | 5h | Frequent writes and frequent reads to the LBA range indicated. |
| | | 6h | No writes and frequent reads to the LBA range indicated. |
| | | 7h | No writes and most frequent reads to the LBA range indicated. |
| | | 8h to Fh | Reserved |

The storage device determines whether a value of the read range list data 511 is valid (S413). When the length in logical blocks 523 of the data 511a, . . . 511h on the read range or the starting LBA 524 of the read range has a valid value, the storage device reads data from the non-volatile memory 320 and stores the data in the fast read buffer of the buffer memory 313 (S414). The storage device may read the data stored in the location that corresponds to the logical block length of the length in logical blocks 523 at the starting LBA 524 of the read range from the non-volatile memory 320. The storage device may store information on the read range of the fast read data stored in the fast read buffer and information on the address in the buffer memory 313 of the fast read data in the internal memory 312. S414 will now be described with reference to FIG. 6 to FIG. 8.

Figure 6:
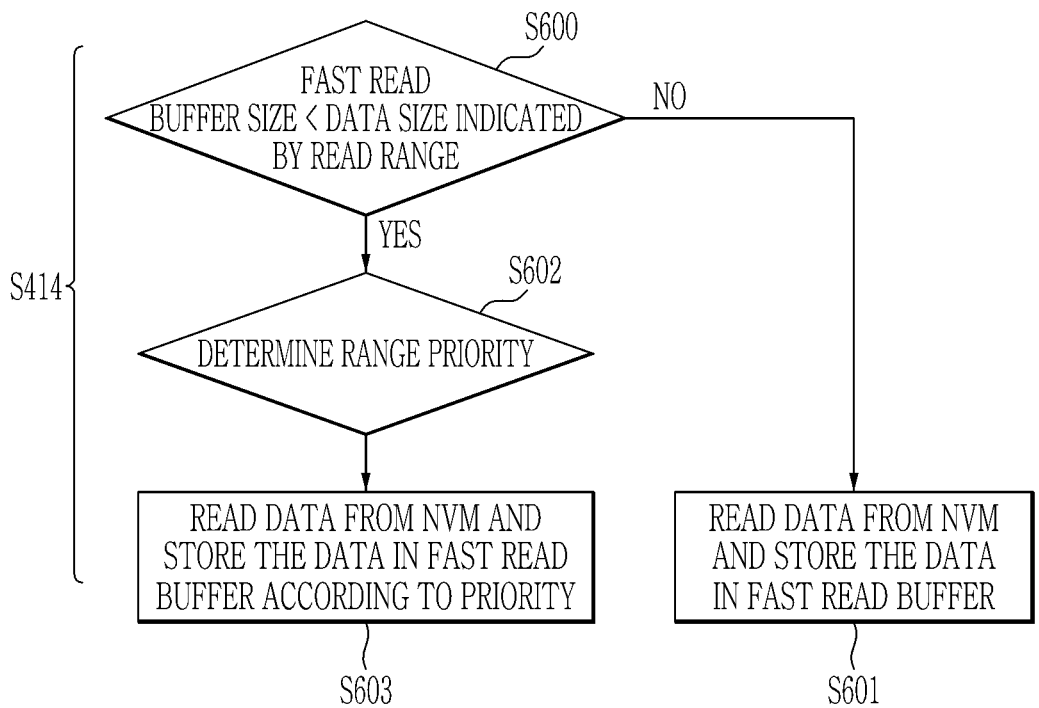
FIG. 6 shows a flowchart of a method of operating a storage device according to an embodiment.
Figure 7:
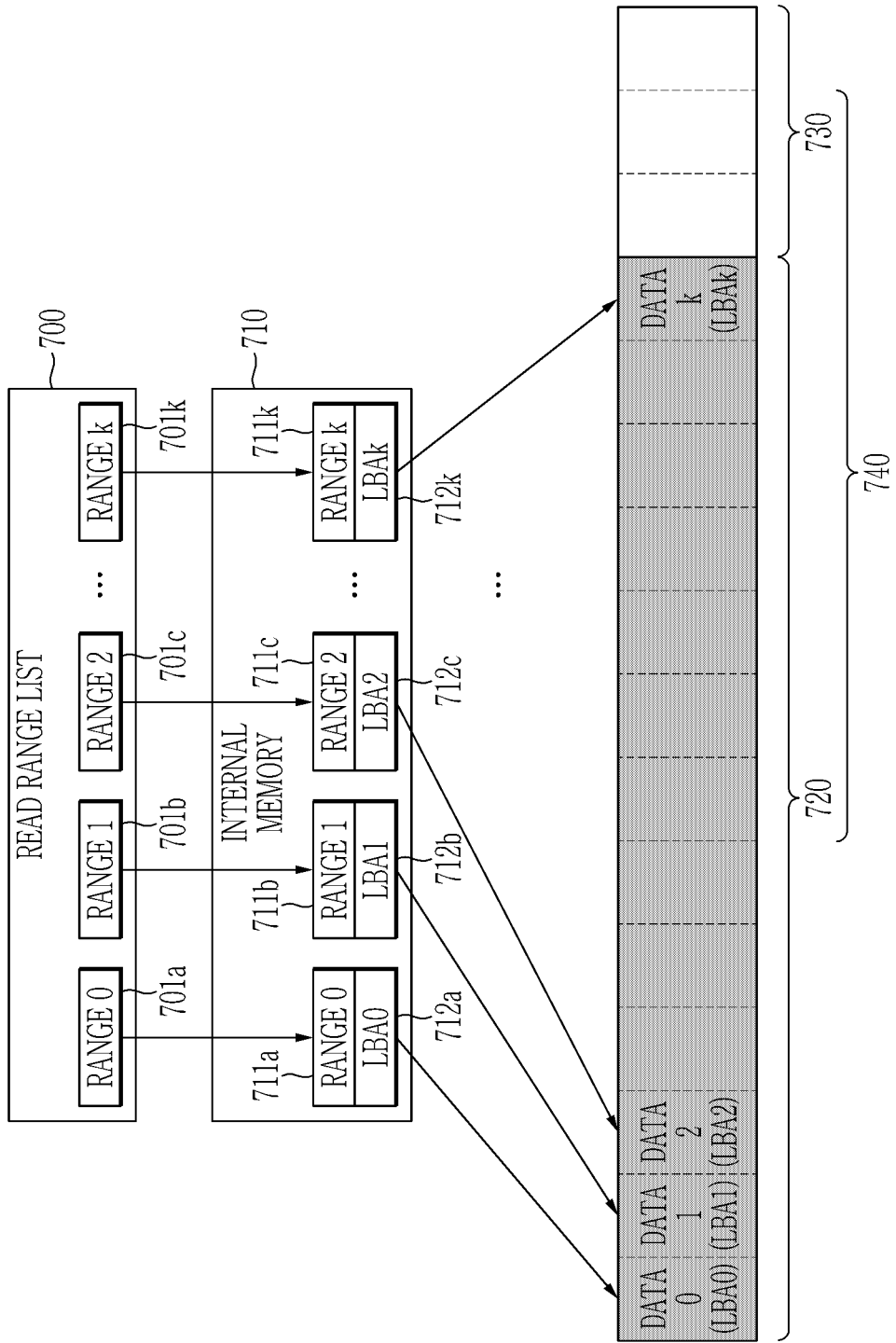
FIG. 7 and FIG. 8 show a buffer memory of a storage device according to an embodiment.
Figure 8:
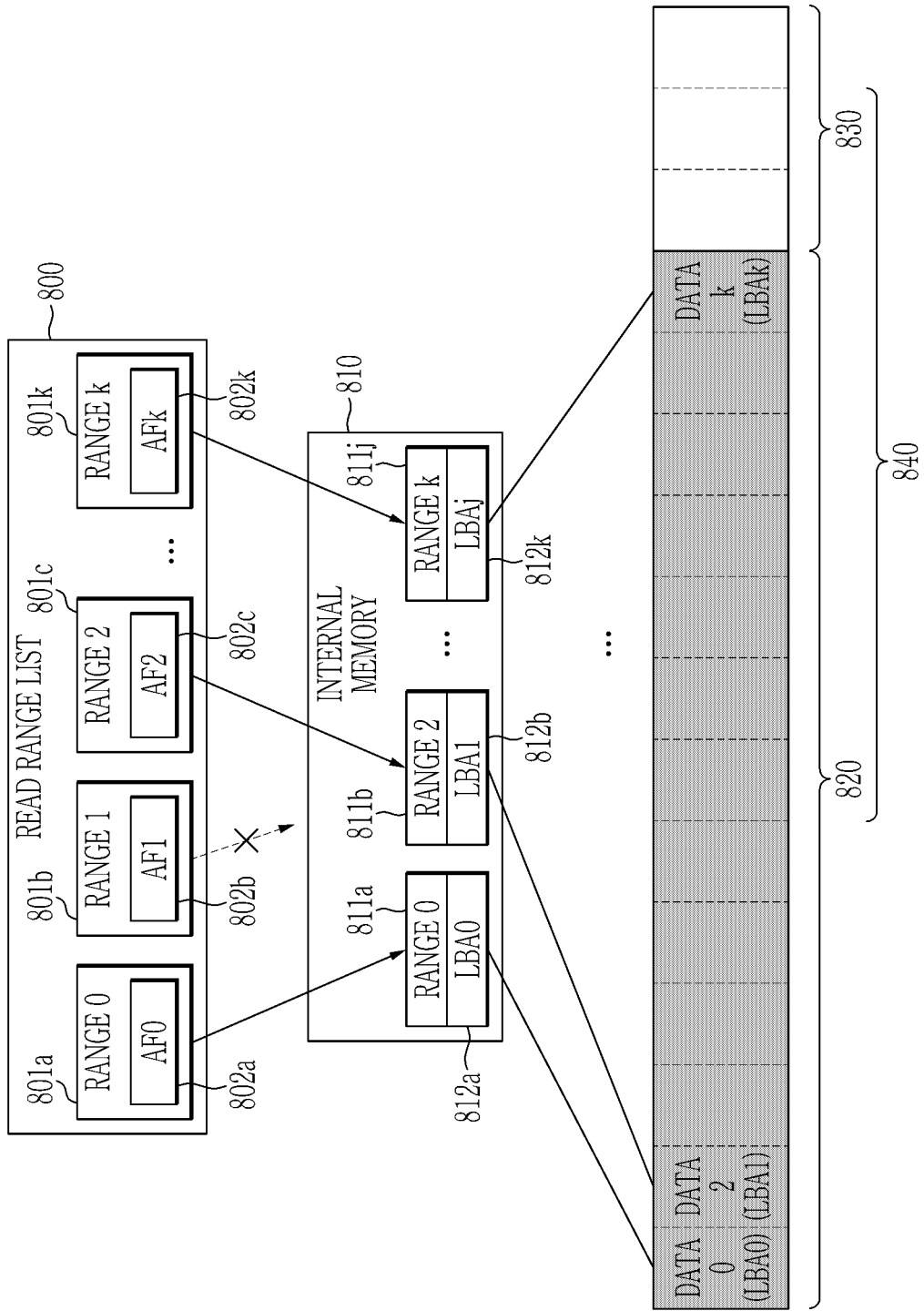

FIG. 6 shows a flowchart of a method of operating a storage device according to an embodiment, and FIG. 7 and FIG. 8 show a buffer memory of a storage device according to an embodiment.

Referring to FIG. 6, the storage device determines whether a size of the fast read buffer is less than a sum of sizes of the data included in the read ranges of the respective data on the at least one read range (S600). The storage device may determine whether the data indicated by the read range may be stored in the fast read buffer.

When the size of the fast read buffer is equal to or greater than the sum of the sizes of the data included in the read ranges of the respective data on the at least one read range (No in S600), the storage device reads the data from the non-volatile memory 320 and stores the data in the fast read buffer (S601).

Referring to FIG. 7 in connection with S601, the read range list data 700 may include data 701a, 701b, 701c, . . . , 701k on at least one read range. The buffer memory 740 may include a fast read buffer 720 and a normal read buffer 730. When the size of the fast read buffer 720 is equal to or greater than the size of the data included in the read ranges of the respective data 701a, 701b, 701c, . . . , 701k on the at least one read range, the data DATA0, DATA1, DATA2, . . . , DATAk included in the read ranges of the respective data 701a, 701b, 701c, . . . , 701k on the at least one read range may be stored in the fast read buffer 720. Information 711a, 711b, 711c, . . . , 711k on the read ranges of the respective data stored in the fast read buffer 720 and information 712a, 712b, 712c, . . . , 712k on the address in the buffer memory 740 of the data may be stored in the internal memory 710.

When the size of the fast read buffer is less than the sum of the sizes of the data included in the read ranges of the respective data on the at least one read range (Yes in S600), the storage device determine priority of the read ranges (S602). The storage device may determine the priority of the read ranges based on the read frequency indicated by read data attribute information of the data on the read ranges. The storage device may/may not store the data included in the read range in the buffer memory 313 according to the read frequency of the data on the read ranges. The storage device may set the priority of the read range of the data on the read range with a low read frequency to be less than the priority of the read range of the data on the read range with a high read frequency. The storage device may store information on the read frequency of the fast read data stored in the fast read buffer in the internal memory 312.

The storage device may read data from the non-volatile memory 320 based on the priority and may store the data in the fast read buffer (S603). For example, the storage device may read the data indicated by the read range with high priority from the non-volatile memory 320 and may store the data in the fast read buffer. When the priorities of the read ranges are the same, the storage device may store the data indicated by the maximum number of read ranges in the fast read buffer. When the priorities of the read ranges are the same, the storage device may store data in the maximum size from among the data indicated by the read range in the fast read buffer.

Referring to FIG. 8 in connection with S602 and S603, the read range list data 800 may include data 801a, 801b, 801c, . . . , 801k on the at least one read range. The respective data 801a, 801b, 801c, . . . , 801k on the at least one read range may include information 802a, 802b, 802c, . . . , 802k on the read frequency. The buffer memory 840 may include a fast read buffer 820 and a normal read buffer 830. When the size of the fast read buffer 820 is less than the size of the data included in the read ranges of the respective data 801a, 801b, 801c, . . . , 801k on the at least one read range, some data DATA0, DATA2, . . . , DATAk of the data included in the read ranges of the respective data 801a, 801b, 801c, . . . , 801k on the at least one read range may be stored in the fast read buffer 820. For example, the data DATA0, DATA2, DATAk included in the read ranges 801a, 801c, and 801k with the read frequency of AF0 may be stored in the fast read buffer 820, and the data included in the read range 801b with the read frequency of AF1 that is lower than AF0 in priority may not be stored in the fast read buffer 820. Information 811a, 811b, . . . , 811k on the read ranges of the respective data DATA0, DATA2, DATAk stored in the fast read buffer 820 and information 812a, 812b, . . . , 812k on the address in the buffer memory 840 of the data may be stored in the internal memory 810.

Referring to FIG. 4, when the storing of data in the fast read buffer is completed, the storage device transmits a completion message representing that the read prepare operation is completed to the host device (S415).

The storage device initializes the data stored in the buffer memory 313 when the length in logical blocks 523 of the data 511a on the read range or the starting LBA 524 of the read range has a specific value (S416). In some embodiments, the specific value may be a code number that is set to initiate the initialization of the buffer memory 313. When the initializing of data of the fast read buffer is completed, the storage device transmits a completion message showing that the operation for initializing the fast read buffer is completed to the host device (S417).

The host device transmits an address (i.e., a read address) and a read command to the storage device (S421). When receiving the read command, the storage device determines whether the address received from the host device is in the read range (i.e., the logical block address range) (S422). The storage device may determine the read range including the address received from the host device by using the information on the read range of the data stored in the fast read buffer stored in the internal memory 312.

When the address received from the host device is in the read range, the storage device outputs the fast read data to the host device (S423). The storage device may read the data that correspond to the address received from the host device from the buffer memory 313 by using the information on the address of the buffer memory 313 of the fast read data stored in the internal memory 312.

When the address received from the host device is not the read range, the storage device may read data from the non-volatile memory 320 and may store the data in the normal read buffer of the buffer memory 313 (S425). The storage device outputs normal read data to the host device (S426).

Figure 9:
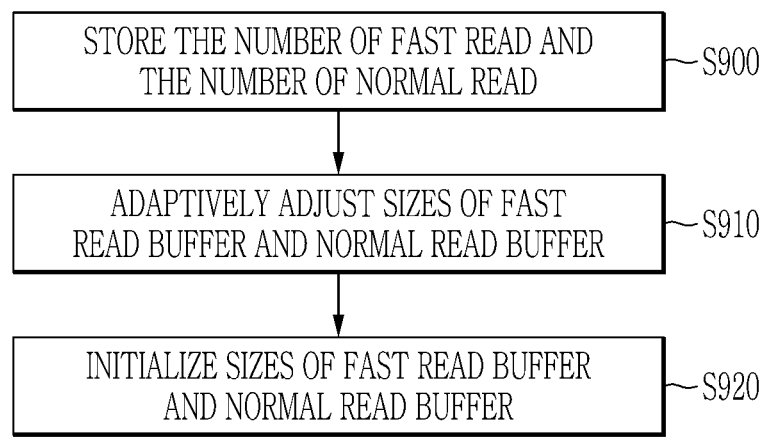
FIG. 9 shows a flowchart of a method of operating a storage device according to an embodiment.

FIG. 9 shows a flowchart of a method of operating a storage device according to an embodiment.

The storage device stores the number of the fast read operations and the number of the normal read operations (S900). When the respective operations are performed, the storage device may count the number of the fast read operations and the number of the normal read operations in the internal memory 312. For example, the storage device may count the number of the fast read operations and the number of the normal read operations when determining whether the address transmitted with the read command is in the read range in S422.

The storage device adaptively adjusts the size of the fast read buffer and the size of the normal read buffer based on the number of the fast read operations and the number of the normal read operations (S910). The storage device may adjust the size of the fast read buffer and the size of the normal read buffer according to a ratio of the number of the fast read operations and the number of the normal read operations. For example, when the size of the fast read buffer is substantially equivalent to the size of the normal read buffer, and the number of the fast read operations is twice the number of the normal read operation, the size of the fast read buffer may be adjusted to be twice the size of the normal read buffer. The storage device may adjust the size of the fast read buffer and the size of the normal read buffer according to the ratio of the rate of increasing the number of the fast read operation and the rate of increasing the number of the normal read operations. For example, when the size of the fast read buffer is substantially equivalent to the size of the normal read buffer, and the rate of increasing the number of the fast read operation is twice the rate of increasing the number of the normal read operations, the size of the fast read buffer may be adjusted to be twice the size of the normal read buffer. In addition, the storage device may adjust the size of the fast read buffer and the size of the normal read buffer based on the number of the fast read operations and the number of the normal read operations. This will now be described with reference to FIG. 10.

Figure 10:
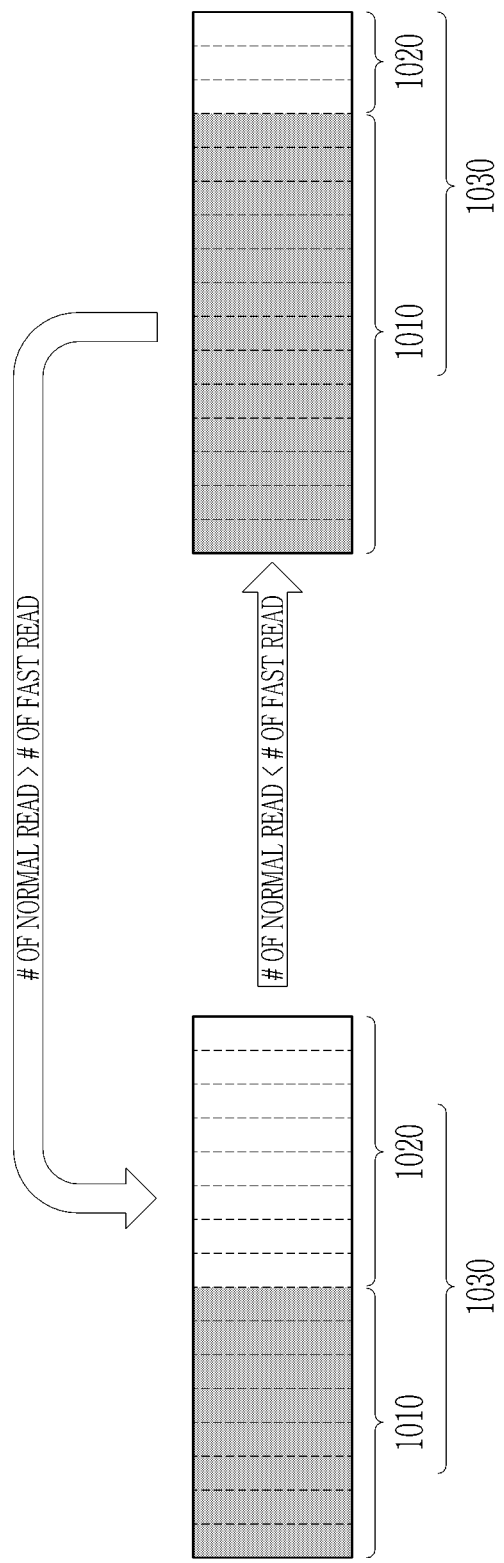
FIG. 10 shows a buffer memory of a storage device according to an embodiment.

FIG. 10 shows a buffer memory of a storage device according to an embodiment.

Referring to FIG. 10, the buffer memory 1030 may include a fast read buffer 1010 and a normal read buffer 1020 that have substantially equivalent sizes. When the time passes by and the number of the normal read operations is greater than the number of the fast read operation, the size of the fast read buffer 1012 may be adjusted to be smaller than the size of the normal read buffer 1022. The buffer memory 1032 may include a fast read buffer 1012 in a first size and a normal read buffer 1022 in a second size that is less than the first size. When the time passes by and the number of the fast read operations is greater than the number of the normal read operations, the size of the fast read buffer 1010 may be adjusted to be substantially equivalent to the size of the normal read buffer 1020 by increasing the size of the fast read buffer 1012.

The storage device initializes the size of the fast read buffer and the size of the normal read buffer (S920). The storage device may initialize the size of the fast read buffer and the size of the normal read buffer when initializing the data stored in the fast read buffer in S416.

Figure 11:
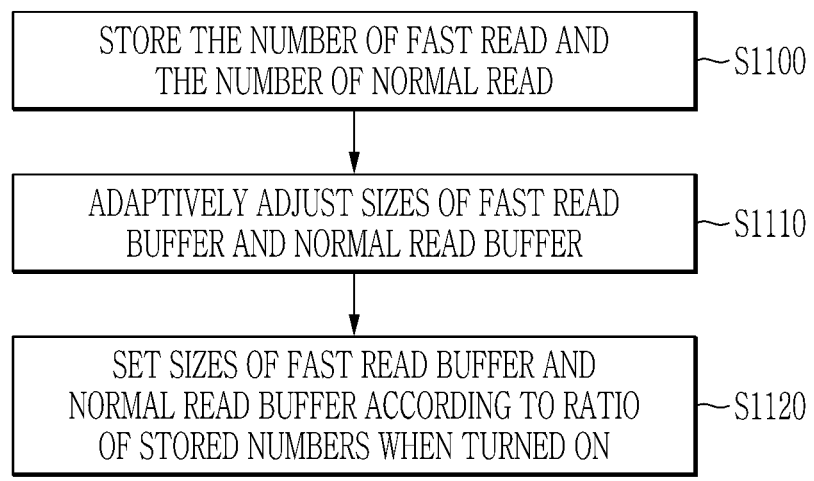
FIG. 11 shows a flowchart of a method of operating a storage device according to an embodiment.

FIG. 11 shows a flowchart of a method of operating a storage device according to an embodiment.

The stages of the operating method given with FIG. 11 that are the same as or similar to the operating method of FIG. 9 will not be described. For example, S1100 is the same as or similar to S900 of FIG. 9, and S1110 is the same as or similar to S910 of FIG. 9.

When turned on, the storage device sets the size of the fast read buffer and the size of the normal read buffer based on the number of the fast read operation and the number of the normal read operation stored in S1100 (S1120). When turned on, the storage device may set the size of the fast read buffer and the size of the normal read buffer based on the number of the fast read operations and the number of the normal read operations stored in the internal memory 312. This will now be described with reference to FIG. 12.

Figure 12:
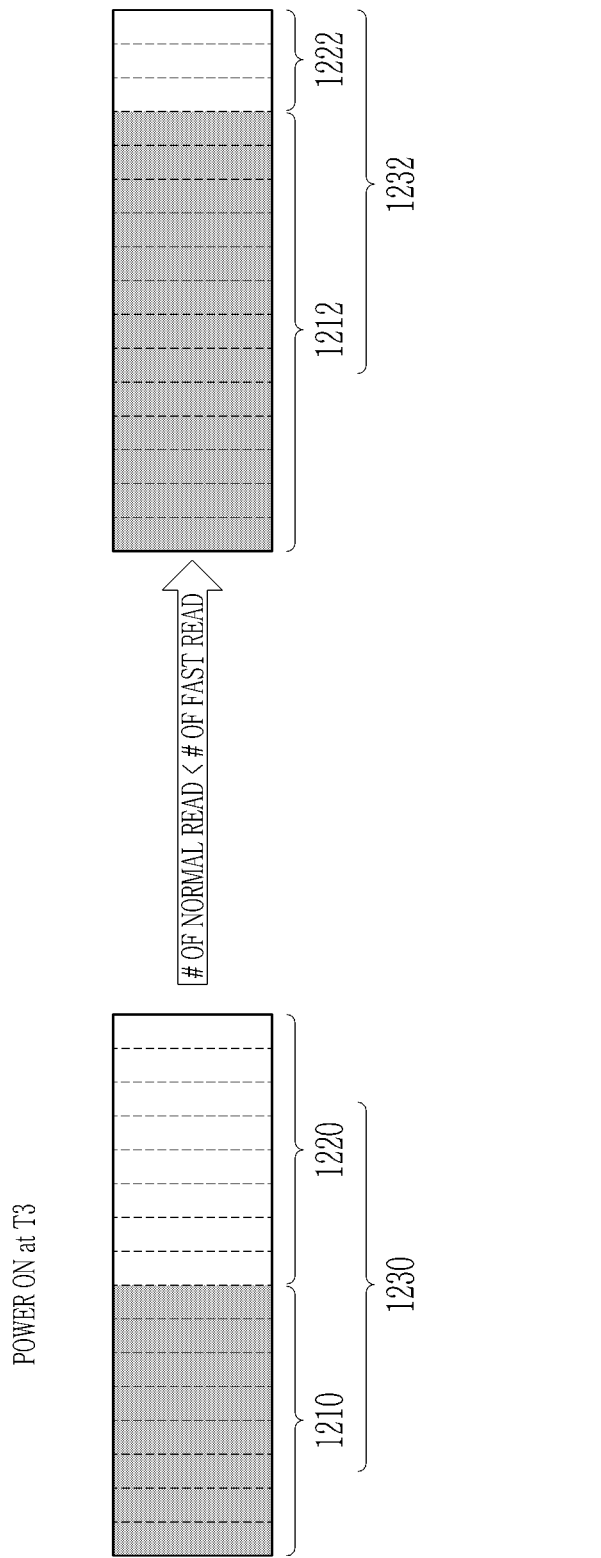
FIG. 12 shows a buffer memory of a storage device according to an embodiment.

FIG. 12 shows a buffer memory of a storage device according to an embodiment.

Referring to FIG. 12, at time T3, when turned on, the storage device may read the number of the fast read operations and the number of the normal read operations stored in the internal memory 312, and may determine that the number of the fast read operations is substantially equivalent to the number of the normal read operations. The storage device may set the sizes of the fast read buffer 1210 and the normal read buffer 1220 to be substantially equivalent to each other. The buffer memory 1230 may include a fast read buffer 1210 and a normal read buffer 1220 that substantially have the equivalent size. When the time passes by and the number of the fast read operations are greater than the number of the normal read operations, the size of the fast read buffer 1212 may be adjusted to be greater than the size of the normal read buffer 1222. The buffer memory 1232 may include a fast read buffer 1212 in a first size and a normal read buffer 1222 in a second size that is less than the first size. When turned on, the storage device may read the number of the fast read operations and the number of the normal read operations stored in the internal memory 312, and may determine the number of the fast read operations to be greater than the number of the normal read operation. The storage device may set the size of the fast read buffer 1212 to be greater than the size of the normal read buffer 1222.

Figure 13:
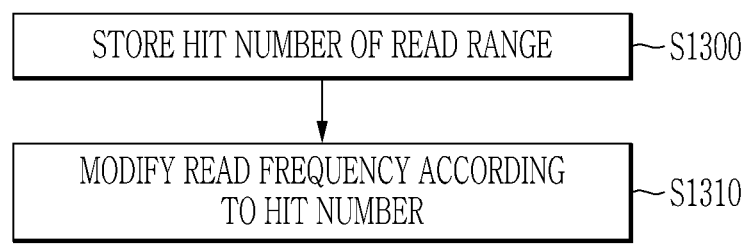
FIG. 13 shows a flowchart of a method of operating a storage device according to an embodiment.

FIG. 13 shows a flowchart of a method of operating a storage device according to an embodiment.

The storage device stores the number of hits of the respective read ranges at the time of the fast read operation (S1300). The storage device may store the number of receiving the address included in the at least one read range together with the read command as the number of hits of the respective read ranges.

The storage device modifies the read frequency based on the number of hits (S1310). The storage device may modify the read frequency of the fast read data stored in the internal memory 312. This will now be described with reference to FIG. 14.

Figure 14:
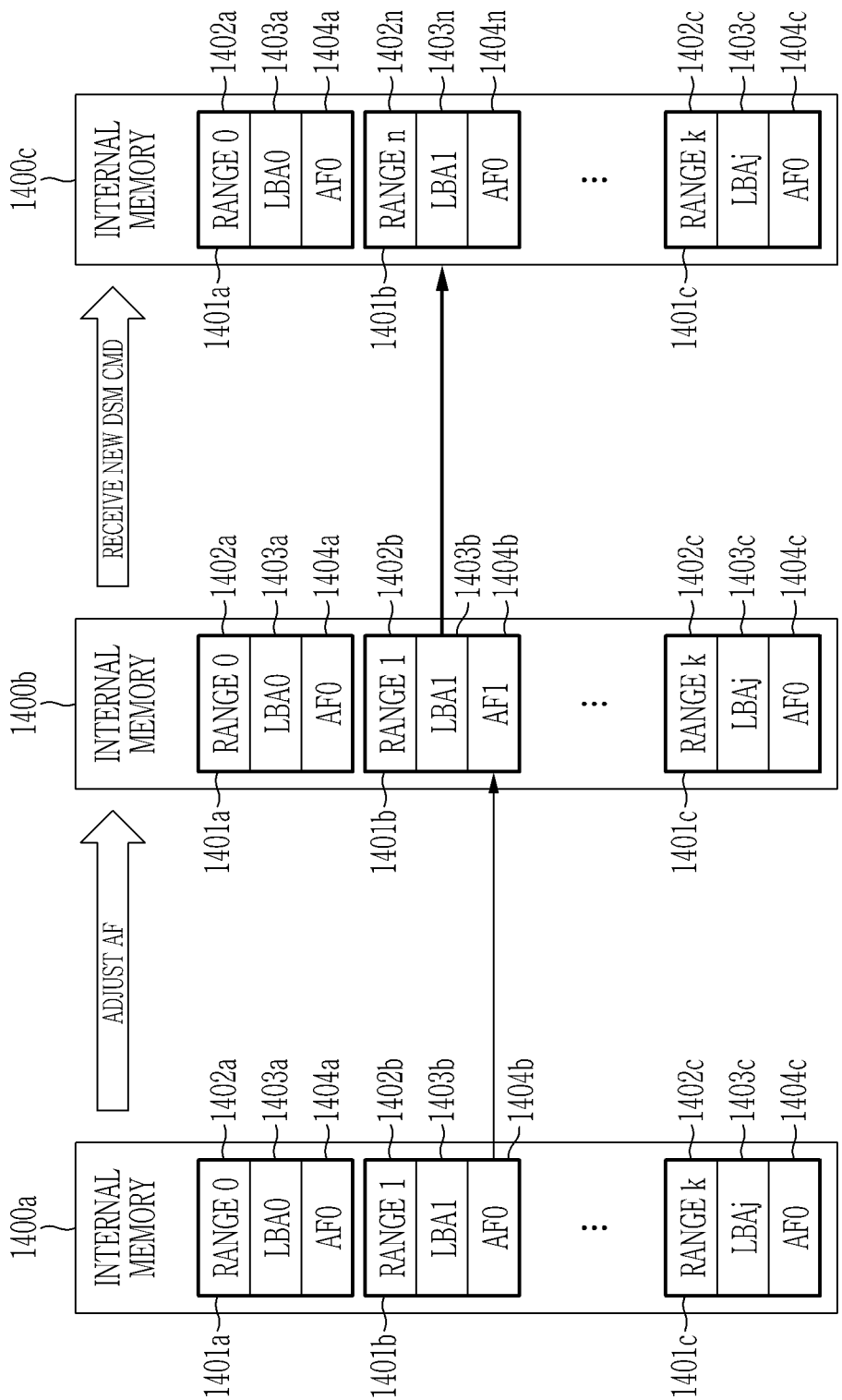
FIG. 14 shows an internal memory of a storage device according to an embodiment.

FIG. 14 shows an internal memory of a storage device according to an embodiment.

Referring to FIG. 14, the internal memory 1400a may store information 1401a, 1401b, . . . 1401c on the fast read data. The information 1401a, 1401b, 1401c may include information 1402a, 1402b, . . . 1402c on the read range of the fast read data, information 1403a, 1403b, . . . 1403c on the address in the buffer memory of the fast read data, and information 1404a, 1404b, . . . 1404c on the read frequency of the fast read data.

The storage device may modify the read frequency of the fast read data based on the number of hits of the respective read ranges. For example, when the number of inputting read commands for reading the data included in the read range RANGE 1 is less than a reference number, the storage device may modify the read frequency of the fast read data that correspond to the read range RANGE 1 from AF0 to AF1 and may store the modified read frequency value in the internal memory 1400b. Here, the reference number may be set based on an average value of the number of inputting the read command for reading the data included in the read ranges RANGE 0, RANGE 1, . . . RANGE k.

The storage device may receive a new dataset management command. When the read frequency of the data on the read range indicated by the data pointer in a new dataset management command is AF0, the storage device may modify the fast read data that correspond to the read range RANGE 1 stored in the buffer memory 313 into fast read data that corresponds to a new read range RANGE n, and may modify the information 1401b on the fast read data that correspond to the read range RANGE 1 into information 1401n on the fast read data that correspond to the new read range RANGE n in the internal memory 1400c. The new information 1401n may include information 1402n on the read range of the fast read data, information 1403n on the address in the buffer memory of the fast read data, and information 1404n on the read frequency of the fast read data.

Figure 15:
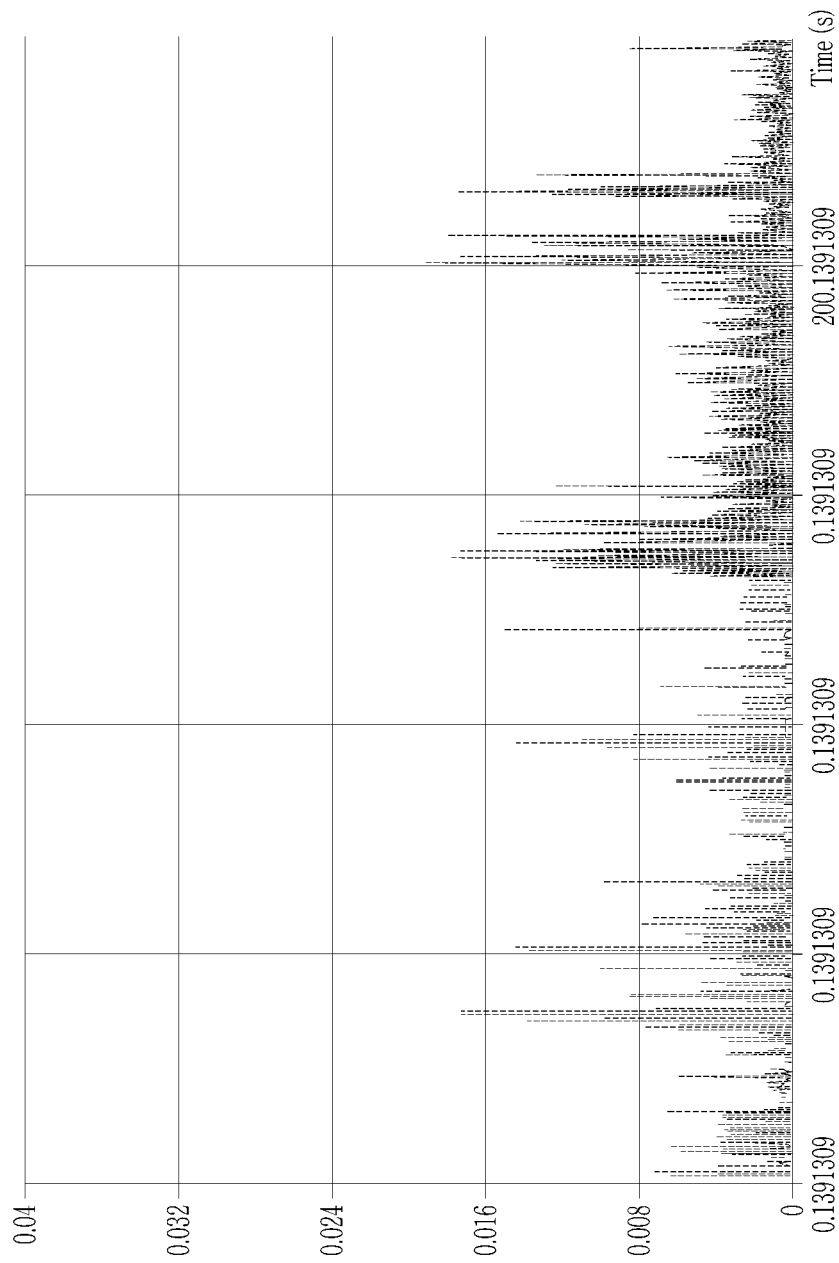
FIG. 15, FIG. 16, and FIG. 17 show graphs of a workload and latency for a host device to read data of a storage device.
Figure 16:
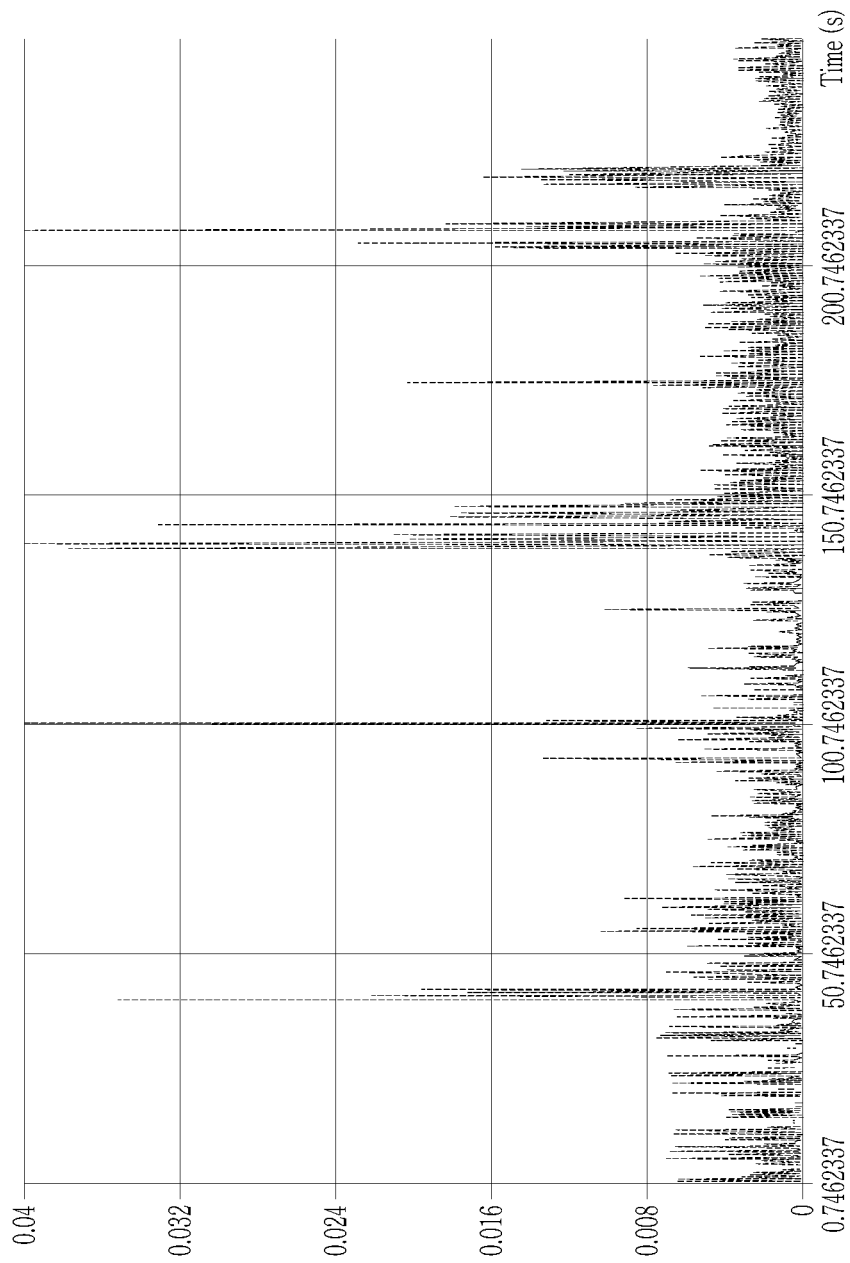
Figure 17:
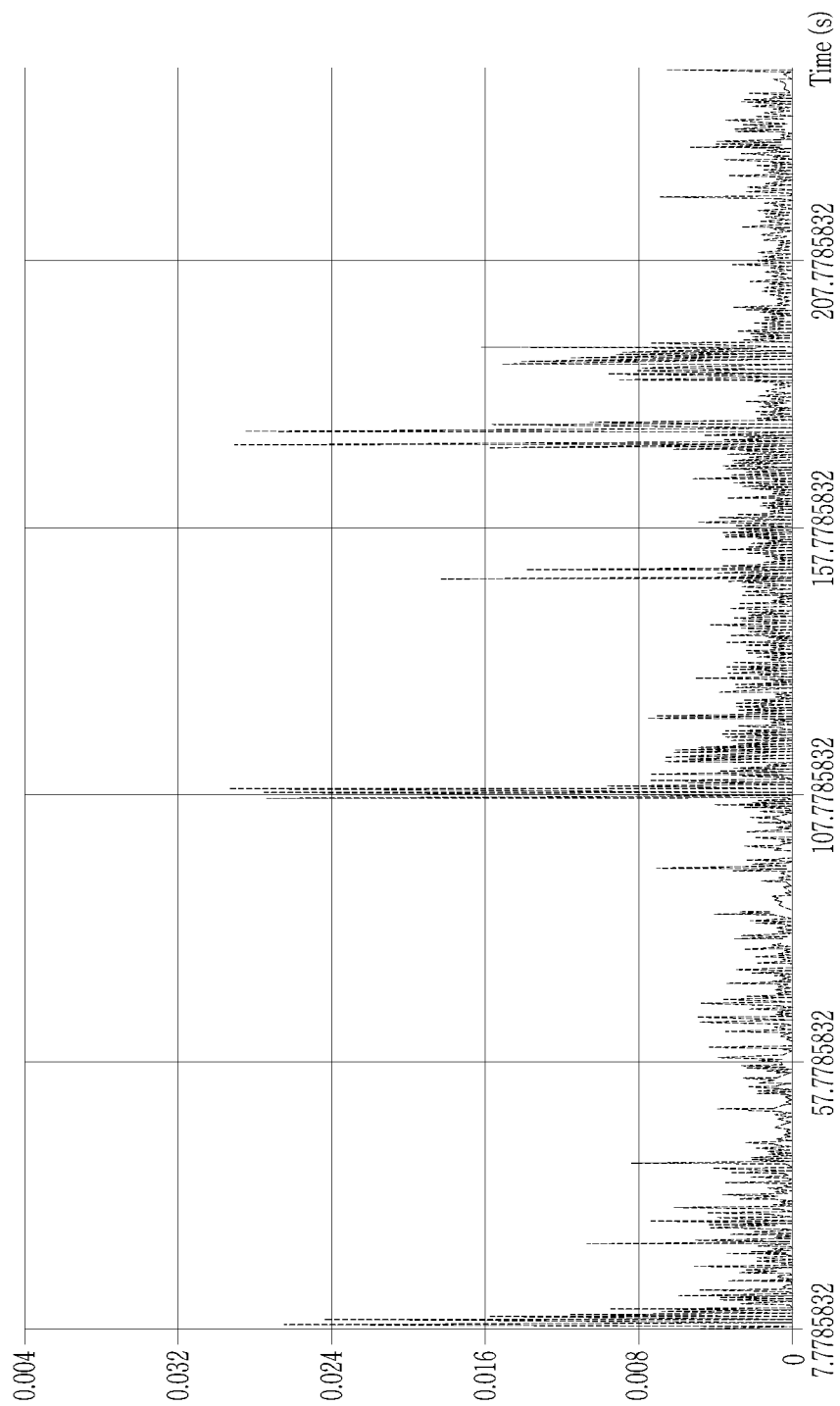

FIG. 15, FIG. 16, and FIG. 17 show graphs of work load and latency for a host device to read data of a storage device.

FIG. 15 shows a workload and latency when a GPU reads data stored in a storage device through a CPU. It is found in this case that a workload distribution is dense with respect to time, and the latency is distributed below 0.024 ms.

FIG. 16 shows a workload and latency when a GPU reads data stored in a storage device by using a direct storage method. It is found in this case that a distribution of a workload with respect to time is sparse compared to the graph shown in FIG. 15, but the workload with the latency of greater than 0.024 ms is frequently generated.

FIG. 17 shows a workload and latency when a GPU uses a direct storage method and a read range according to an embodiment. In this case, it is found that the distribution of a workload is sparse compared to the graph of FIG. 15, and a generation frequency of a workload with the latency of greater than 0.024 ms is less than the graph shown in FIG. 16.

Figure 18:
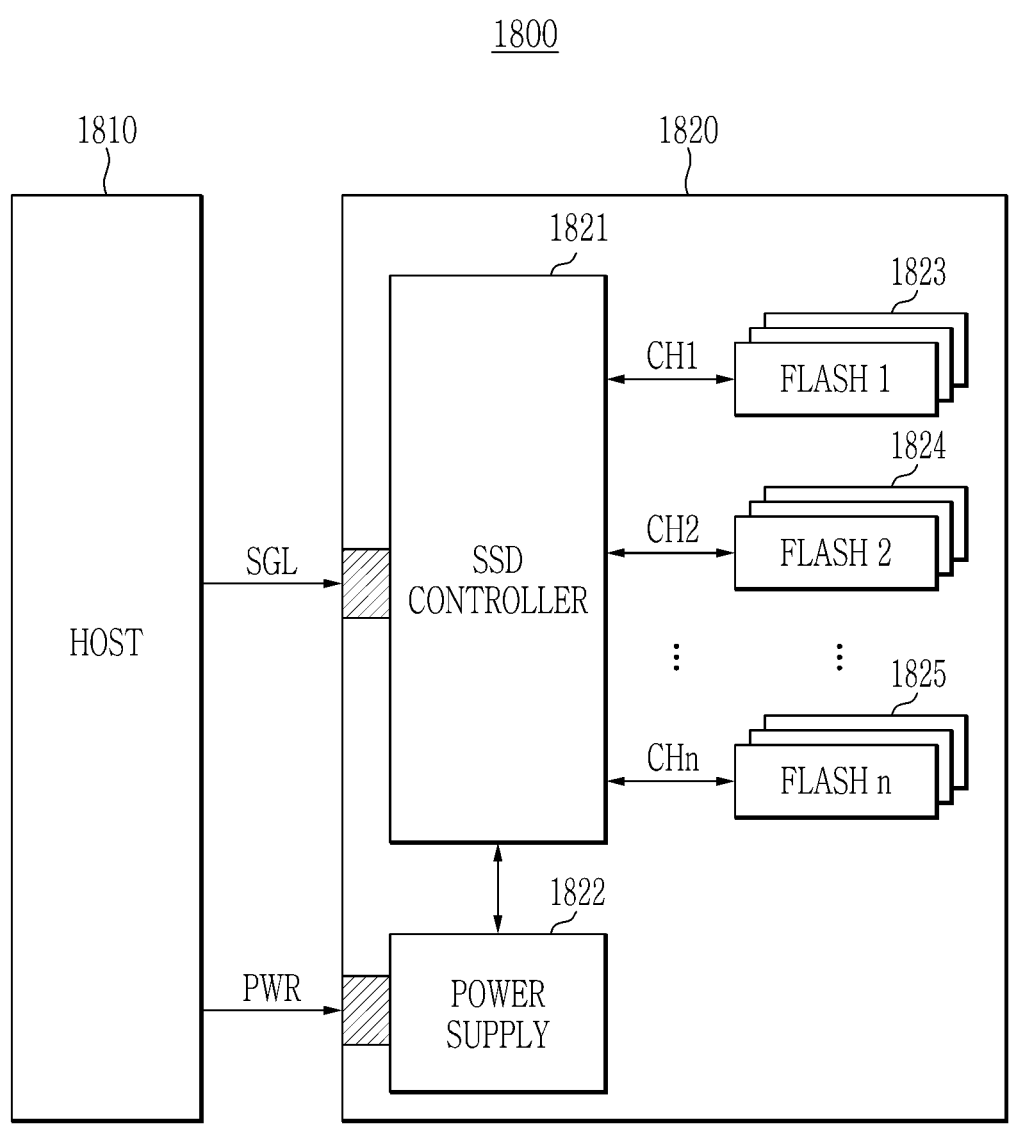
FIG. 18 shows a block diagram of an example in which a storage device is applied to a solid-state drive (SSD) system according to an embodiment.

FIG. 18 shows a block diagram of an example in which a storage device is applied to a solid-state drive (SSD) system according to an embodiment.

Referring to FIG. 18, the SSD system 1800 may include a host 1810 and an SSD 1820.

The SSD 1820 may be realized by using the embodiments described with reference to FIG. 1 to FIG. 14. The SSD 1820 may transmit/receive signals to/from the host 1810 through a signal connector SGL, and may receive a power voltage through a power connector PWR.

The SSD 1820 may receive the dataset management command and the read command through the signal connector SGL.

The SSD 1820 may include a controller 1821, an auxiliary power supply 1822, and a plurality of memory systems 1823, 1524, and 1525. The memory systems 1823, 1524, and 1525 may respectively include at least one flash memory device as a storage device. Further, the respective flash memory devices may include at least one die, and at least one block may be disposed on each die The controller 1821 may communicate with a plurality of memory systems 1823, 1524, and 1525 through a plurality of channels Ch1, . . . , Chn. The controller 1821 may receive data on the read range from the host 1810 by using the data pointer of the dataset management command, may read the data included in the read range in the data on the read range from a plurality of memory systems 1823, 1524, and 1525, may store the data in the buffer memory, and may output the data stored in the buffer memory in the host 1810 when the address and the read command included in the read range are transmitted from the host 1810.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A storage device comprising:
a non-volatile memory;
a buffer memory including a first region; and
a storage controller configured to:
receive first host data indicating a first logical block address range of the non-volatile memory from a host device;
read first memory data from the non-volatile memory using the first logical block address range; and
store the first memory data in the buffer memory,
wherein the storage controller is configured further to:
receive a read command and a read address from the host device;
determine whether the read address is within the first logical block address range;
read, in response to the read address being determined as within the first logical block address range and the read command, the first memory data from the buffer memory without accessing the non-volatile memory; and
output the first memory data from the buffer memory to the host device,
wherein the storage controller:
receives data that are associated with a plurality of read ranges, and
selectively stores the data associated with the plurality of read ranges in the buffer memory as the first memory data based on a read frequency of respective data associated with the plurality of read ranges, wherein each read range of the plurality of read ranges is a corresponding logical block address range of the non-volatile memory, and wherein the storage controller selectively stores the data associated with the plurality of read ranges in the buffer memory based on the read frequency for respective data associated with respective read ranges when a size of the first region for storing the first memory data of the buffer memory is less than a size of the data associated with the plurality of read ranges.

2. The storage device of claim 1, wherein the storage controller is configured further to:

read, in response to the read address being determined as not in the first logical block address range and the read command, second memory data from the non-volatile memory based on the read address;

store the second memory data in the buffer memory; and output the second memory data from the buffer memory to the host device.

3. The storage device of claim 2, wherein the buffer memory further includes:

a second region configured to store the second memory data.

4. The storage device of claim 3, wherein the storage controller is configured further to:

count a first number of outputting the first memory data stored in the first region of the buffer memory;

count a second number of outputting the second memory data stored in the second region of the buffer memory; and adjust the size of the first region and a size of the second region based on the first and second numbers.

5. The storage device of claim 3, wherein the storage controller initializes, in response to a specific value included in the first host data, the size of the first region and a size of the second region.

6. The storage device of claim 1, wherein the storage controller initializes, in response to a specific value included in the first host data, the first memory data stored in the buffer memory.

7. The storage device of claim 1, wherein the storage controller:

receives second host data indicating a second logical block address range of the non-volatile memory from the host device, and replaces the first memory data stored in the buffer memory with third memory data associated with the second logical block address range based on a read frequency of the third memory data associated with the second logical block address range and the read frequency of the first memory data stored in the buffer memory.

8. The storage device of claim 1, further comprising an internal memory configured to store the read frequency of the first memory data stored in the buffer memory, wherein the storage controller modifies the read frequency stored in the internal memory based on a number of outputting the first memory data to the host device.

9. The storage device of claim 1, wherein the first host data includes:

a length of the first logical block address range; and a starting logical block address of the first logical block address range, and wherein a logical block address range of the non-volatile memory corresponds to an address range between the starting logical block address and an ending logical block address that is represented by a sum of the starting logical block address and the length of the first logical block address range.

10. The storage device of claim 1, wherein the storage controller:

receives a dataset management command from the host device, the dataset management command including a data pointer indicating a position of the first host data in a host memory of the host device, and reads the first host data among read range list data that are stored in the host memory of the host device based on the data pointer of the dataset management command.

11. A method of operating a storage device comprising:

receiving, from a host device coupled to the storage device, a first dataset management command including a first data pointer indicating a position of first host data of a first read range;

reading, from a host memory of the host device, the first host data of the first read range based on the first data pointer;

reading first memory data that are associated with a first address in the first read range from a first memory and storing the first memory data in a second memory, wherein the second memory is faster than the first memory;

receiving, from the host device, a read address and a read command;

determining whether the read address is the same as the first address; and outputting, in response to the read address being determined as the same as the first address, the first memory data stored in the second memory to the host device.

12. The method of claim 11, further comprising:

reading, in response to the read address being determined as not the same as the first address, second memory data that are associated with the read address from the first memory;

storing the second memory data in the second memory; and outputting the second memory data to the host device.

13. The method of claim 12, wherein the second memory includes a first region and a second region, the first memory data are stored in the first region, and the second memory data are stored in the second region, and the operating method further includes adjusting a size of the first region and a size of the second region based on a number of outputs of the first memory data stored in the second memory and a number of outputs of the second memory data stored in the second memory.

14. The method of claim 13, further comprising initializing, in response to a specific value included in the first host data of the first read range, the size of the first region and the size of the second region.

15. The method of claim 11, further comprising:

receiving, from the host device, a second dataset management command including a second data pointer indicating a position of second host data of a second read range;

reading, from the host memory of the host device, the second host data of the second read range based on the second data pointer, wherein the second host data of the second read range includes a second address to access the first memory of the storage device; and reading second memory data that are associated with the second address in the second read range from the first memory and replacing the first memory data stored in the second memory with the second memory data based on a first read frequency included in the first host data of the first read range and a second read frequency included in the second host data of the second read range, wherein the first read frequency is a number of reading the first memory data, and the second read frequency is a number of reading the second memory data.

16. A storage system comprising:

a host device configured to:

store a host data in a host memory of the host device, wherein the host data is associated with an address and a read range in the host memory, output a dataset management command including a data pointer indicating a position of the host data in the host memory, and output a read address and a read command; and a storage device including a first memory and a second memory, wherein the second memory is faster than the first memory, wherein the storage device is configured to:

receive the dataset management command;

read the host data from the host memory of the host device using the data pointer of the dataset management command; and read a memory data from the first memory using the address of the host data to store the memory data in the second memory, and wherein the storage device is configured further to:

receive the read address and the read command from the host device;

determine whether the read address is in the read range; and output, in response to the read address being determined as in the read range, the memory data stored in the second memory to the host device, without accessing the first memory.

17. The storage system of claim 16, wherein the host data include a read frequency, and wherein the storage device reads the memory data that are associated with the read address of the read range and selectively stores the memory data in the second memory based on the read frequency.

* * * * *